United States Patent
Buttau et al.

(10) Patent No.: US 10,669,100 B2
(45) Date of Patent: Jun. 2, 2020

(54) LIFTING AND CONVEYING DEVICE AND SECTION CONVEYOR HAVING THE LIFTING AND CONVEYING DEVICE

(71) Applicant: Robert Bosch GmbH, Stuttgart (DE)

(72) Inventors: Hans-Peter Buttau, Lauffen (DE); Markus Kiebel, Stuttgart (DE); Peter Ludwig, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/366,075

(22) Filed: Mar. 27, 2019

(65) Prior Publication Data

US 2019/0300287 A1 Oct. 3, 2019

(30) Foreign Application Priority Data

Mar. 27, 2018 (DE) .................. 10 2018 204 644

(51) Int. Cl.
*B65G 15/22* (2006.01)
*B65G 29/02* (2006.01)
*B65G 47/53* (2006.01)

(52) U.S. Cl.
CPC ............ *B65G 15/22* (2013.01); *B65G 29/02* (2013.01); *B65G 47/53* (2013.01); *B65G 2201/02* (2013.01)

(58) Field of Classification Search
CPC .... B65G 2207/18; B65G 47/53; B65G 47/54; B65G 47/71; B65G 15/22; B65G 2201/02; B65G 29/02
USPC ............................. 198/370.06, 370.09, 371.2
See application file for complete search history.

(56) References Cited

U.S. PATENT DOCUMENTS

| | | | |
|---|---|---|---|
| 6,464,064 B1* | 10/2002 | Rieg ...................... | B65G 47/54 198/370.01 |
| 8,684,169 B2* | 4/2014 | Itoh ...................... | B65G 13/075 198/370.06 |
| 9,878,857 B2 | 1/2018 | Itoh et al. | |
| 2002/0153225 A1* | 10/2002 | Wood ...................... | B65G 47/34 198/370.09 |
| 2003/0111320 A1* | 6/2003 | van Leeuwen ...... | B65G 15/105 198/370.06 |
| 2014/0262684 A1 | 9/2014 | Skanse et al. | |
| 2016/0362260 A1 | 12/2016 | Itoh et al. | |
| 2016/0365560 A1 | 12/2016 | Itoh et al. | |

FOREIGN PATENT DOCUMENTS

| | | |
|---|---|---|
| DE | 39 17 484 A1 | 12/1990 |
| DE | 20 2006 004 029 U1 | 9/2007 |
| EP | 1 318 088 A1 | 6/2003 |
| FR | 2 327 940 A1 | 5/1977 |
| JP | S50-009758 Y1 | 3/1975 |
| JP | H07-315562 A | 12/1995 |
| JP | 2012-250809 A | 12/2012 |
| WO | 2010/086980 A1 | 8/2010 |

* cited by examiner

*Primary Examiner* — James R Bidwell
(74) *Attorney, Agent, or Firm* — Maginot, Moore & Beck LLP

(57) ABSTRACT

A lifting and conveying device includes a lifting body, a revolving conveyor element, and a linear drive. The revolving conveyor element is deflected on the lifting body to a conveyor path on which an item can be conveyed. The lifting body is engageable or engaged by the linear drive of the device for a lifting of the conveyor path.

17 Claims, 10 Drawing Sheets

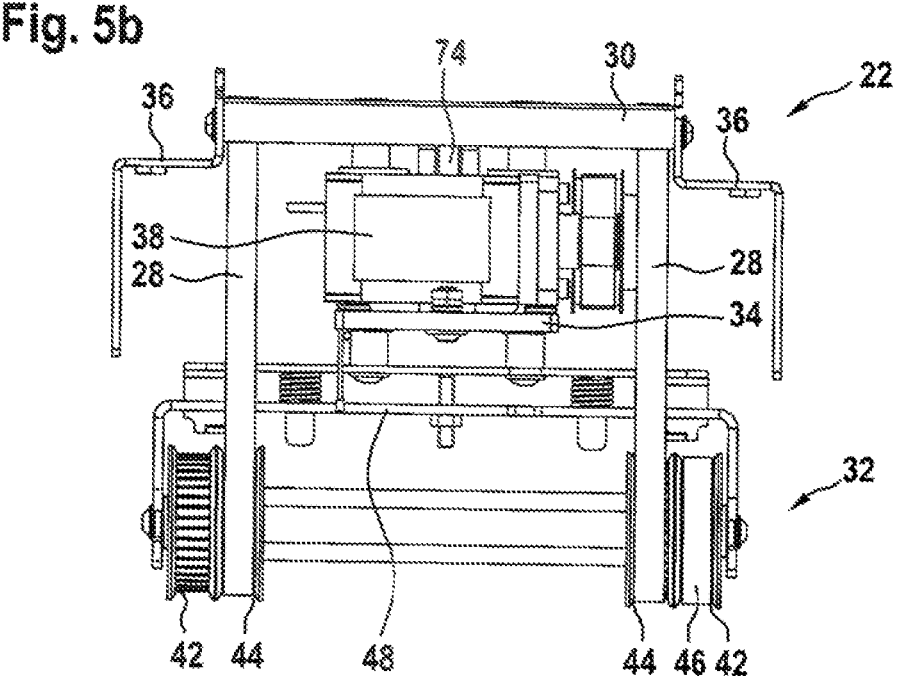
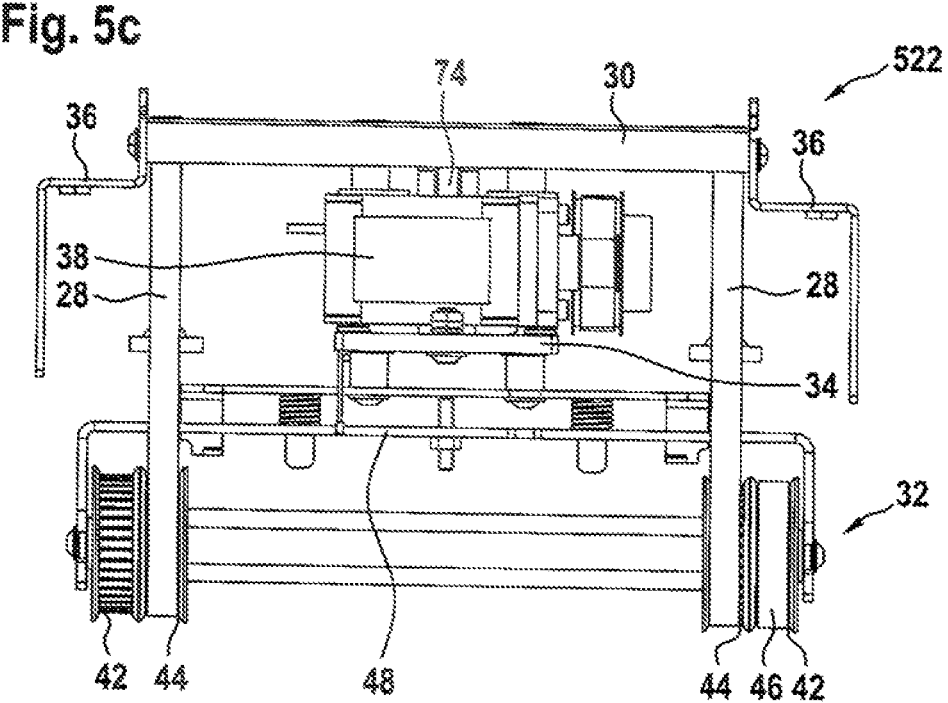

LIFTING AND CONVEYING DEVICE AND SECTION CONVEYOR HAVING THE LIFTING AND CONVEYING DEVICE

This application claims priority under 35 U.S.C. § 119 to patent application no. DE 10 2018 204 644.1, filed on Mar. 27, 2018 in Germany, the disclosure of which is incorporated herein by reference in its entirety.

BACKGROUND

The disclosure relates to a lifting and conveying device and a section conveyor having the lifting and conveying device.

A section conveyor has one or more conveyor lines. For each conveyor line, a conveyor means revolves continuously along a linear or curved conveyor path. The item to be conveyed is usually supported on the conveyor means by means of a workpiece carrier. The conveyor means often has two parallel strands, for example conveyor belts, arranged on both sides of a center axis of the conveyor path. Therefore, the conveyor line moves the workpiece carrier and the workpiece along the conveyor path to a point at which the workpiece carrier with the workpiece must be transferred, for example, to another, in particular intersecting or angled, conveyor line or to a processing station. To this end, a device is required, which lifts the workpiece carrier from the first conveyor line and moves it to the second conveyor line or the processing station. Such a device must consequently be able to execute a lifting and conveying movement and is therefore referred to as a lifting and conveying device. Since the conveying movement often takes place transversely to the first conveyor line, the term transverse lifting unit is customary.

Printed document EP 1 318 088 B1 discloses a lifting and conveying device having a base body which is fastened in a stationary manner and a pneumatic lifting cylinder arranged thereon. The linearly movable piston thereof is coupled to a lifting body of the device, at which a revolving conveyor means is deflected. In normal operation, the conveyor path of the device, which is formed by the conveyor means, is lowered below the conveyor path of the conveyor line and therefore out of engagement with passing workpiece carriers. If a workpiece carrier is to be relocated, the piston, and therefore the lifting body, executes an upward lift and lifts the workpiece carrier from the first conveyor line. The workpiece carrier then no longer lies on the conveyor means of the first conveyor line, but on that of the lifting and conveying device. If the conveyor means thereof is now set in motion, the workpiece carrier is moved in the direction of the conveyor path of the device, i.e. transversely to the first conveyor line, and conveyed to the second conveyor line.

Disadvantages of the disclosed solution can be the relative complex manner of supplying pneumatic pressure medium to the pneumatic cylinder, the large installation space required by the pneumatic cylinder and a comparatively low load capacity of the pneumatic cylinder.

SUMMARY

In contrast, the disclosure is based on the object of providing a lifting and conveying device having a simplified construction, and a section conveyor having such a device.

The first object is achieved by a lifting and conveying device having the features described herein, the second by a section conveyor having the lifting and conveying device.

Advantageous further developments of the lifting and conveying device are described herein.

A lifting and conveying device has a carrier which is capable of lifting, also called a lifting body, on which a revolving conveyor means is deflected to a conveyor path of the device. An item can be directly or indirectly deposited on this conveyor means and thus conveyed along the conveyor path. The conveyor means can have two parallel-spaced strands, for example, wherein the item or an item carrier can be deposited on the strands. The lifting body is engaged, or engageable as required, by a linear drive of the device so that a lifting of the lifting body can be executed. In this case, the lift takes place in particular normally to the conveyor path, in particular normally to a conveyor plane in which the conveyor path is formed. According to the disclosure, the linear drive has a rotary motor and a motor gear, in particular a cam gear, via which an angle of rotation of the rotary motor can be converted into the lift.

Compared with the solution of the prior art, which is based on a pneumatic cylinder, the solution having the rotary motor and the motor gear for a required load capacity has proven more compact in terms of the device technology.

Supplying energy to the rotary motor has proven particularly simple if, in a further development, the rotary motor is configured as an electric motor.

The lift is particularly precisely controllable if, in a further development, the rotary motor is formed as a stepping motor.

In a further development, the cam gear has a cam disk, which is directly or indirectly fixedly connected in terms of rotational drive to the rotary motor and by means of which the lifting body is indirectly or directly engageable or engaged for lifting purposes. It is advantageous here that a cam disk can be configured robustly such that, in addition to controlling the lift, it is also suitable for absorbing a high load of the item and the item carrier.

In a further development, the device has a base body which can be arranged stationary with respect to a superordinate assembly, in particular with respect to a section conveyor, and on which at least the cam gear is arranged. This cam gear can thus be reliably fastened and high bearing forces and moments of the cam disk can be absorbed by the assembly.

In a further development, the rotary motor is also arranged on the base body.

In a particularly compact construction of the device, the rotary motor and the cam gear are covered by the lifting body; i.e. they are located completely below the lifting body as seen in the lifting direction. This requires a minimum base area of the lifting body, in particular a minimum track width of the device.

For a narrower conveyor path of the device, a further development has proven advantageous in which the cam gear is covered by the lifting body and the associated rotary motor is arranged laterally offset from the conveyor path of the device. To this end, the base body can extend laterally beyond the conveyor path in a linear or angled manner, wherein the rotary motor is then fastened, in particular flange-mounted, on the linear or on the angled portion of the base panel.

The cam disk can be directly fixedly connected in terms of rotational drive to a drive shaft of the rotary motor. Alternatively, it can be arranged rotatably mounted on the base body and be fixedly connected in terms of rotational drive to the rotary motor via a gear, for example via a stepped-up or stepped-down chain or toothed belt gear.

In a further development, the lifting body is tensioned against the cam disk, in particular by means of a tensioning means, in particular a spring. It is thus ensured that the lifting body is always in contact with the cam disk, in particular a control surface of the cam disk—i.e. it does not lift away—so that the control of the lift always takes place in a controlled manner.

In a further development, for controlling the lift, the cam disk has an, in particular outer circumferential, control surface. For bringing about the lift, this extends preferably eccentrically, i.e., depending on a circumferential angle, at an alterable radial spacing from the axis of rotation of the cam disk.

The control surface and the axis of rotation of the cam disk are preferably parallel so that shear forces are not produced in the direction of this axis of rotation.

The coupling to the lifting body or the engagement thereof takes place in a further-developed variant in that the control surface can slide directly along a fixed lifting body portion, for example on a journal or a projection of the lifting body. Alternatively to this, the coupling or engagement can take place in that a rolling body, which is rotatably connected to the lifting body, can roll along the control surface. This variant has proven to be low-wear since little sliding friction occurs in the contact region between the rolling body and the cam disk and tangential shear forces in the direction of rotation are lower. This has proven to be more advantageous the greater the weight of the item or item carrier.

The axis of rotation of the cam disk and the axis of rotation of the rolling body are preferably parallel.

In a variant of the outer circumferential control surface, this is formed by an edge surface of an eccentric guide groove formed within the cam disk. A journal, which is fixedly connected to the lifting body, or a rolling body, which is rotatably connected to the lifting body, is then guided in the guide groove. It is advantageous here that the journal or rolling body—and therefore the lifting body—is reliably coupled to the cam disk via the groove in both lifting directions. The control over the lift is therefore realized for all lifting directions and also in the event of high lifting speeds.

In a further development, the radial spacing of the control surface increases with an increase in the circumferential angle from a minimum value, at which the lifting body is fully retracted, to a maximum value at which the lifting body is fully extended.

In a particularly preferred further development, the control surface extends circumferentially spirally, at least in sections, around an axis of rotation of the cam disk.

For the detailed control of the lift and the lifting speed, the control surface in a further development is divided in the circumferential direction into lifting portions with a different pitch. In this case, the pitch is calculated from the change in the radial spacing for each change in the circumferential angle. A given change in the angle of rotation of the rotary motor results in different lifts for the various lifting portions, and a given angular speed of the rotation of the rotary motor results in different lifting speeds. Therefore, a first lifting portion can have, for example, a greater gradient than a successive second lifting portion, which means that the lifting of the lifting body takes place quickly at first and more slowly as it approaches an apex of the lift.

To interrupt the lift and to keep the lifting body in comparatively stable balance during this interruption, the control surface in a further development has at least one latching portion. This is preferably configured and arranged on the control surface in such a way that, in cooperation with the lifting body—in particular under the effect of gravity—it brings about a pause of the lifting body in the latching position. The latching portion is particularly preferably configured and arranged on the control surface in such a way that, in cooperation with the lifting body—in particular under the effect of gravity—the cam disk is without torque. Drive energy of the rotary motor is then not required to stop the lifting body, the item carrier and the item.

For example, the at least one latching portion is arranged in a circumferential angle region of the minimum value or the maximum value or in a circumferential angle region between the minimum value and the maximum value.

A plurality of latching portions can be provided.

In a particularly simple manner in terms of the device technology, the at least one latching portion is realized by a concave recess or depression in the radial direction, into which the lifting body portion or the rolling body can dip. In other words, the radial spacing in the region of the latching portion has a local minimum.

The at least one latching portion and the lifting body portion or rolling body are preferably formed such that they are matched to one another with form fit. In this case, a cylinder-segment form has proven advantageous for the latching portion and the lifting body portion and a cylindrical form has proven advantageous for the rolling body.

To keep the wear between the latching portion and the lifting body portion or rolling body low, edges of the at least one latching portion which are arranged in the circumferential direction are rounded in a further development.

In a further development, the device has a conveyor motor for driving a conveyor means. Therefore, both the lifting and the conveying can take place independently of the superordinate assembly already mentioned.

Alternatively to this, in particular to keep the number of motors low, the device in a further development does not have a conveyor motor but only a conveyor gear which is provided for coupling to a drive of a superordinate assembly, in particular the section conveyor. The device is therefore ready to be supplied with external drive energy.

A section conveyor has a first conveyor means, which revolves along a first conveyor path. Therefore, via the first conveyor path, an item carrier, for example, having an item or workpiece located thereon can be conveyed from one workstation to the next or to a second conveyor path. To lift and move the item carrier or the item from the first conveyor path, the section conveyor has at least one lifting and conveying device, which is formed according to the description above and is arrangeable or arranged stationary on the, or in the region of, the first conveyor path. Owing to the above-described construction with a rotary motor and motor gear for converting the rotary movement into the lift, this lifting and conveying device has proven to be compact in terms of the device technology, which means that the section conveyor can also be configured more compactly.

In a further development, the section conveyor has at least one second conveyor means which revolves along a second conveyor path on which the item can be moved via the lifting and conveying device.

In this case, the conveyor path of the device and that of the second conveyor path extend in alignment or in the same direction.

The first conveyor path extends in alignment with or intersecting the second conveyor path.

BRIEF DESCRIPTION OF THE DRAWINGS

An exemplary embodiment of a section conveyor according to the disclosure and a plurality of exemplary embodiments of a lifting and conveying device according to the disclosure are illustrated in the drawings. The disclosure is now explained in more detail with reference to the figures of these drawings.

The drawings show:

FIG. 5b an exemplary embodiment of a lifting and conveying device without an integrated conveyor drive;

FIG. 5c an exemplary embodiment of a lifting and conveying device without an integrated conveyor drive;

DETAILED DESCRIPTION

Figure 1:
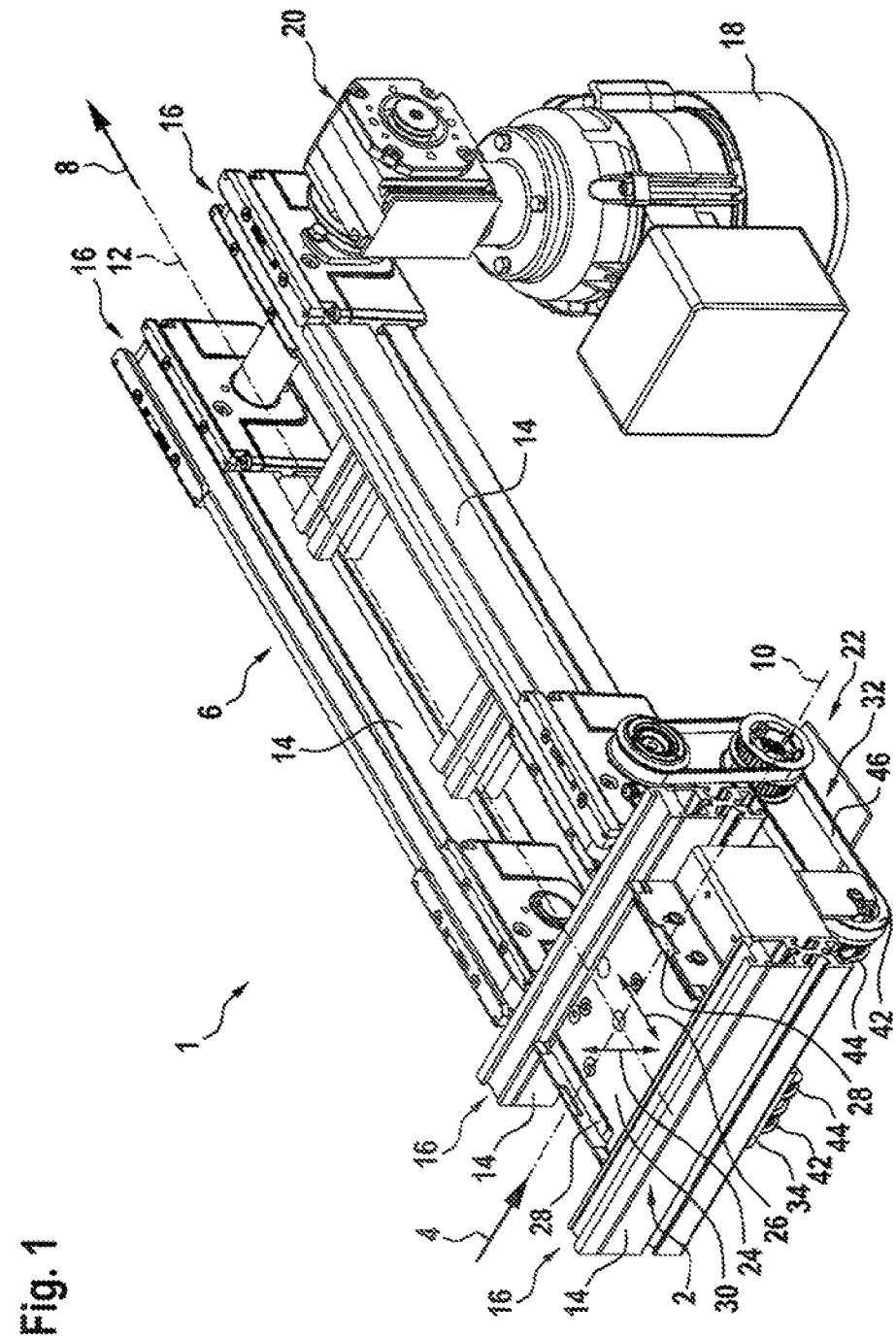
FIG. 1 a section conveyor according to an exemplary embodiment in a perspective view.

According to FIG. 1, a section conveyor 1 has a first conveyor line or conveyor path 2 having a first conveying direction 4 and, at a right angle thereto, a second conveyor line or second conveyor path 6 having a second conveying direction 8. Both conveyor lines 2, 6 are configured from the same components such that they are substantially identical. They each have profile carriers 14, which are arranged parallel to a center axis 10, 12 and on which a two-strand conveyor means 16, configured as a toothed belt, revolves in a known manner. In this case, an item or workpiece carrier (not illustrated) can be placed on the conveyor means 16 and transported by the conveying movement of the conveyor means 16.

The section conveyor 1 has a drive motor 18, which, via a gear 20, is fixedly connected in terms of rotational drive to belt pulleys received in the profiles 14 of the second conveyor line 6. The conveyor means 16 of the second conveyor line 6 is thus driven. The first conveyor line 2 (not illustrated) also has a comparable drive machine.

Bordered on both sides by the profiles 14 of the first conveyor line 2 is a lifting and conveying device 22 which serves to move a workpiece carrier from the first conveyor path 2 to the second conveyor path 6. In this case, the lifting and conveying device 22 is capable of bringing about a vertical lift 24 and a translatory displacement 26 of the workpiece carrier. The lifting and conveying device 22 also has a two-strand conveyor means 28. This is deflected to a conveyor path at a carrier or lifting body 30 of the device 22. In this case, a conveyor gear 32 is provided with belt pulleys and toothed belts via which drive energy can be transmitted from the drive motor 18 to the conveyor means 28 of the device 22.

The lifting and conveying device 22 is fixedly connected to the profiles 14 of the first conveyor line 2 via a base body or a base panel 34.

Figure 2:
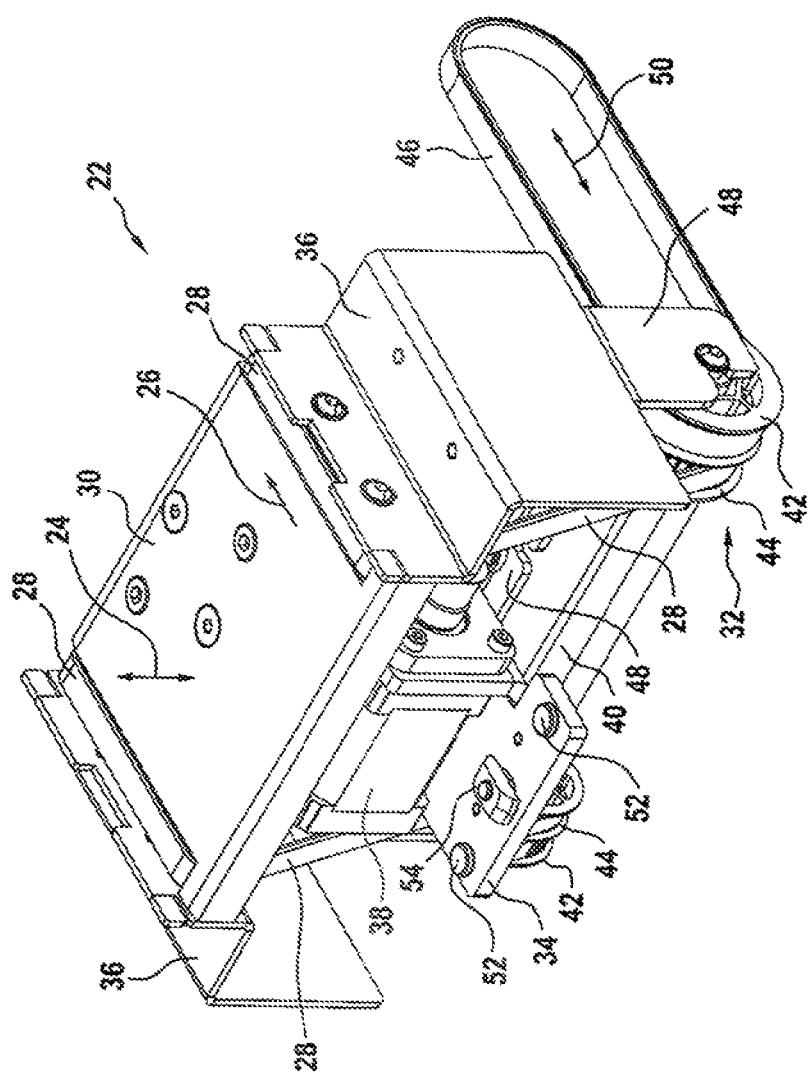
FIG. 2 a lifting and conveying device of the section conveyor according to FIG. 1, according to a first exemplary embodiment, in a perspective view.

FIG. 2 shows the lifting and conveying device 22 according to FIG. 1 separated from the rest of the section conveyor 1 according to FIG. 1. Cover plates 36 are fastened to the lifting body 30 laterally outside the two strands of the conveyor means 28. These cover plates extend downward from the lifting body 30 in the direction of the base panel 34 with an outwardly angled shoulder. An electric stepping motor 38, via which the lifting 24 of the lifting body 30 is brought about, is fasted on the base panel 34.

Two belt pulleys 42, 44 are each fixedly arranged in terms of rotation at end portions of a drive shaft 40 arranged at the bottom in relation to the lifting direction 24. In this case, the conveyor means 28 of the lifting and conveying device 22, more precisely the toothed belts, revolves on the inner belt pulley 44 of the belt pulleys 42, 44 in each case and is deflected twice at deflection shafts (not illustrated) mounted on the lifting body 30. The driving of the drive shaft 40 takes place via the laterally outwardly arranged belt pulleys 42, around which a toothed belt 46 is wrapped. According to FIG. 1, this toothed belt 46 is driven via a further belt pulley and toothed belt arrangement by means of the gear 20 of the drive motor 18.

In this case, the drive shaft 40 is rotatable in a plate profile 48, which is angled downward in a u shape, and mounted such that it slides in a direction 50. According to FIG. 2, the device 22 is fastened on the profiles 14 by means of the base panel 34 via four screws 52 (two of which are concealed) and two profile nuts 54 (one of which is concealed), which engage in profile recesses of the profiles 14. Therefore, the base panel 34 and all components fixedly connected thereto, in particular the electric stepping motor 38, are arranged stationary. On the other hand, the lifting body 30, the cover plate 36 fastened thereto, the conveyor means 28 and the conveyor gear 32, which is tightly connected to the lifting body 30 via the conveyor means 28, are arranged relative to the base panel such that they are capable of lifting.

Figure 3:
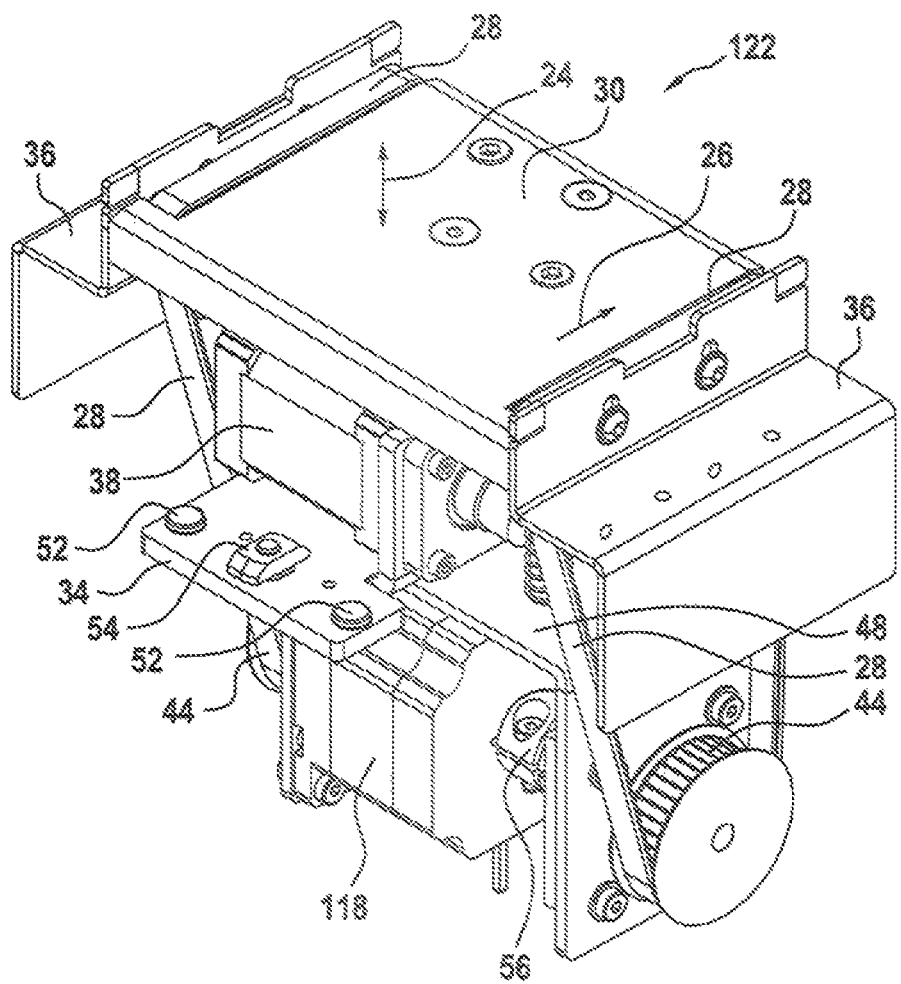
FIG. 3 a lifting and conveying device according to a second exemplary embodiment in a perspective view.

FIG. 3 shows a second exemplary embodiment of a lifting and conveying device 122, which corresponds substantially to parts of that according to FIGS. 1 and 2. Therefore, only the differences are discussed. As already described, the conveyor means 28 of the lifting and conveying device 22 is driven according to FIG. 2 via the toothed belt 46 and, according to FIG. 1, the drive machine 18 of the second conveyor line 6. A common drive motor 18 could thus be used for different conveyor tasks, those of the second conveyor line 6 and those of the lifting and conveying device 22, which reduces the complexity in terms of the device technology.

However, a solution such as that shown by the exemplary embodiment according to FIG. 3 is more flexibly controllable, whilst dispensing with the comparatively complex conveyor gear 22. This is based on the fact that a decentralized drive motor 118 is provided here, which drives the conveyor means 28 of the device 122 independently of the drive motor 18. This is a direct drive, wherein one of the belt pulleys 44 is fixedly connected in terms of rotation directly, and the other by means of a clutch 56, to a drive shaft of the drive motor 118.

According to FIG. 3, it can be seen that, compared to the previous exemplary embodiment, the overall height in the lifting direction 24 of this exemplary embodiment is somewhat greater since installation space has to be provided for the comparatively tall drive motor 118.

Figure 4A:
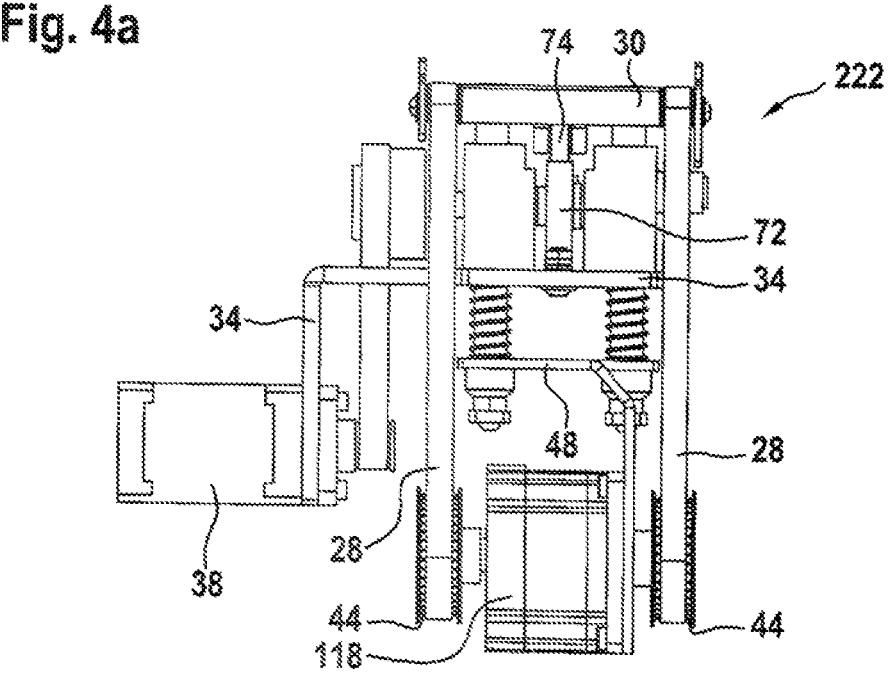
FIG. 4a an exemplary embodiment of a lifting and conveying device with an integrated conveyor drive.
Figure 4B:
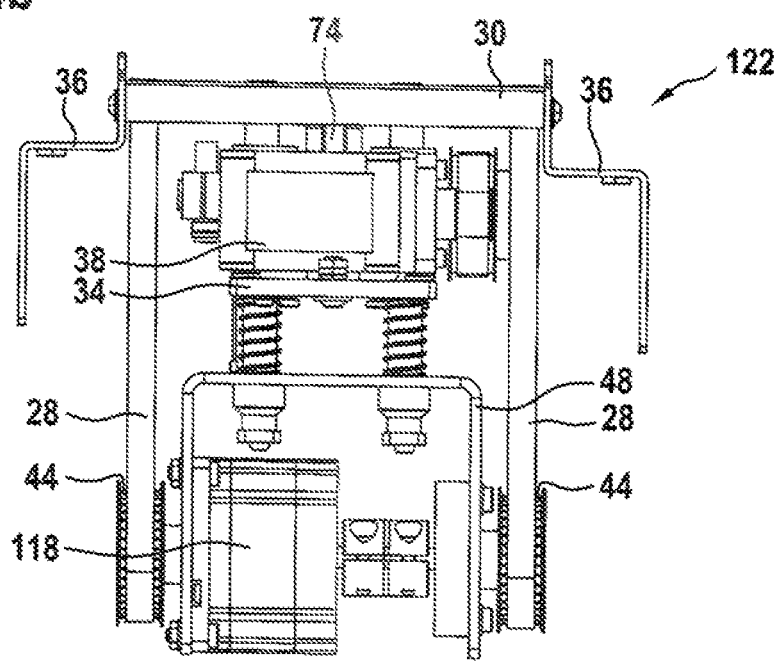
FIG. 4b an exemplary embodiment of a lifting and conveying device with an integrated conveyor drive.
Figure 4C:
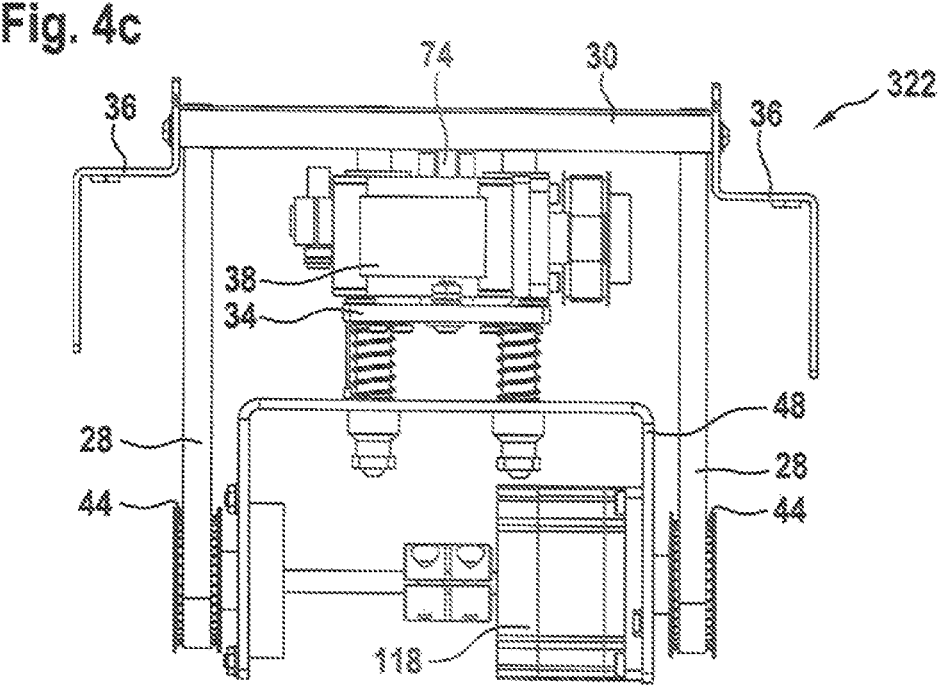
FIG. 4c an exemplary embodiment of a lifting and conveying device with an integrated conveyor drive.

FIGS. 4a to 4c show exemplary embodiments of a lifting and conveying device 222; 122; 322, wherein the lifting and conveying device 122 according to FIG. 4b corresponds to that of FIG. 3. Common to the lifting and conveying devices 122; 222 and 322 is that their conveyor means 28 are supplied with drive energy independently via the drive motor 118. In this case, the track width of the conveyor means 28, i.e. a spacing of the two toothed belts of the conveyor means 28 transversely to the conveying direction, increases from the lifting and conveying device 222 via the lifting and conveying device 122 to the lifting and conveying device 322. This is shown in FIGS. 4a to 4c with reference to the width of the respective lifting body 30. For the particularly narrow lifting and conveying device 222, this means that the electric stepping motor 38 must be arranged laterally removed and can no longer be arranged between the toothed belts 28. This is achieved in that the base panel 34 extends laterally beyond the lifting body 30 on one side and is angled downward. The electric stepping motor 38 is flange-mounted by its end face on the angled portion of the base panel 34.

On the other hand, with a wider track and a wider lifting body 30 according to FIGS. 4b and 4c, this is unnecessary and the electric stepping motor 38 can be arranged centrally on the base panel 34 in a space-saving manner between the two toothed belts of the conveyor means 28. The lifting and conveying device 322 according to FIG. 4c corresponds to that according to FIG. 4b and has only an approximately 50% wider track.

Figure 5A:
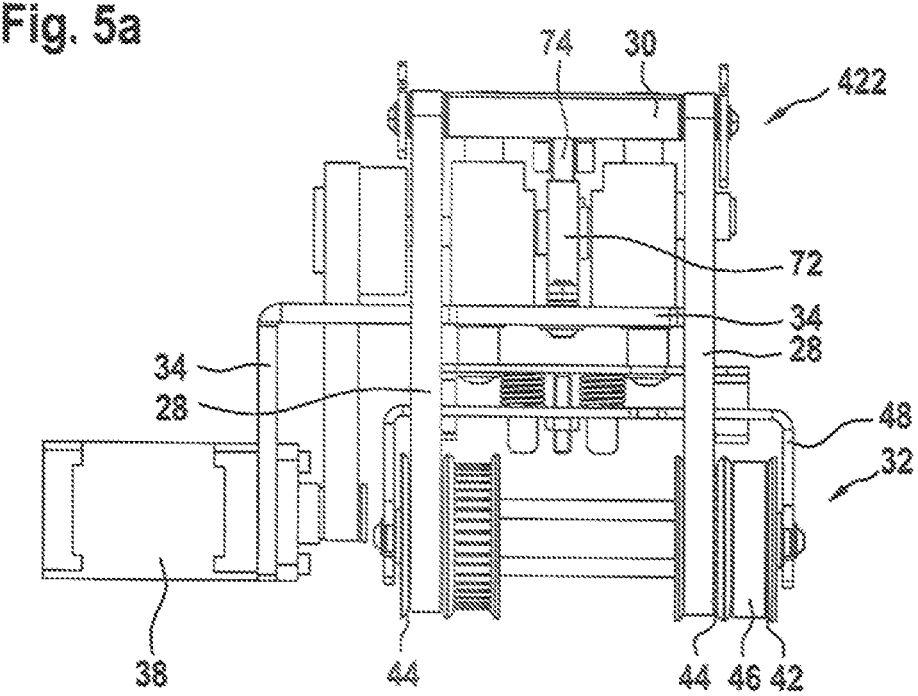
FIG. 5a an exemplary embodiment of a lifting and conveying device without an integrated conveyor drive.

FIGS. 5a to 5c show exemplary embodiments of a lifting and conveying device 422; 22; 522, wherein the lifting and conveying device 22 according to FIG. 5b corresponds to that according to FIG. 2. In this case, the same track widths are realized as those shown in the exemplary embodiments according to FIGS. 4a to 4c. A substantial difference from the exemplary embodiments according to FIGS. 4a to 4c is that the conveyor means 28 of the lifting and conveying devices 422; 22; 522 is not driven by an integrated drive motor (c.f. 118 FIGS. 4a to 4c) but via the conveyor gear 32 (c.f. FIG. 2). Further common features and deviations of these two concepts—one with an integrated conveyor drive 118, one without—will be expanded upon in the following two FIGS. 6 and 7 with reference to the exemplary embodiments according to FIGS. 2, 5b and 3, 4b.

Figure 6:
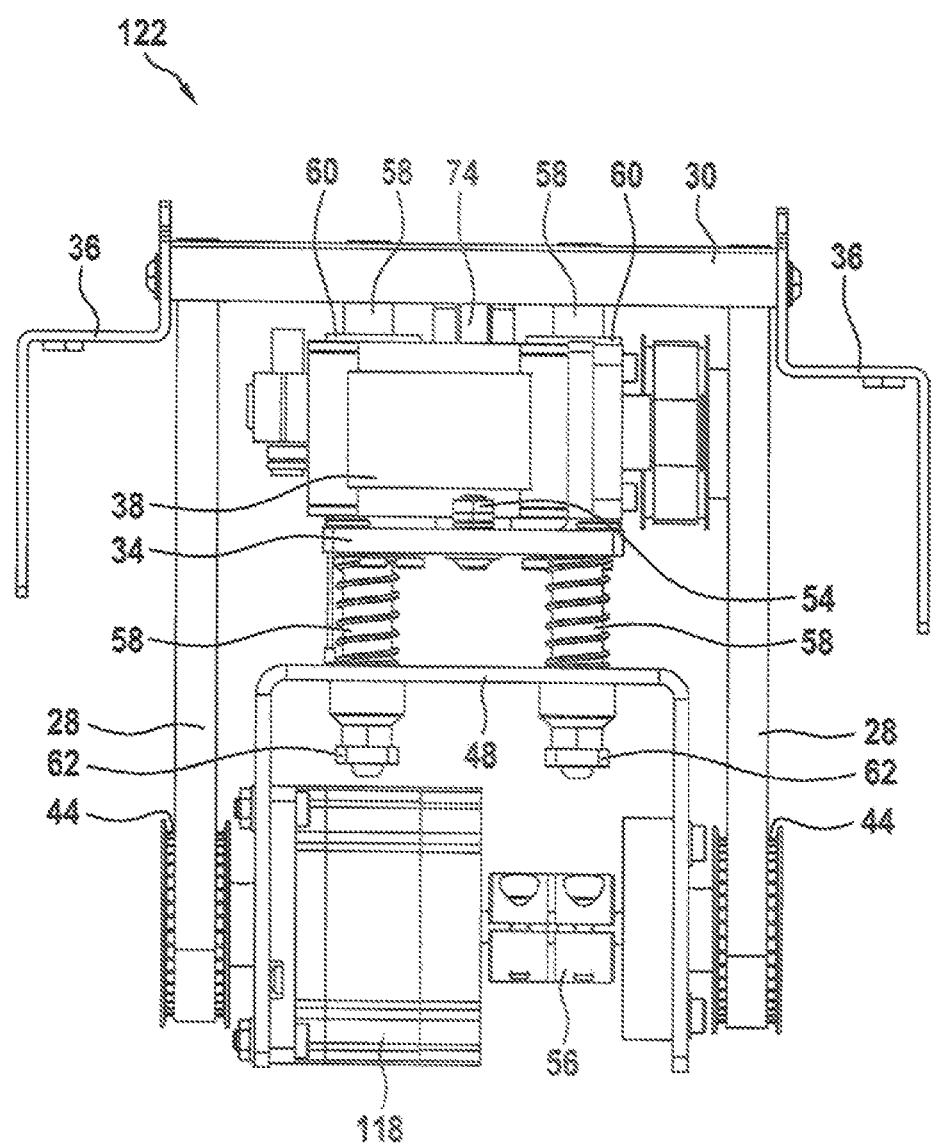
FIG. 6 the lifting and conveying device according to FIGS. 3 and 4b in a front view.

FIG. 6 shows the second exemplary embodiment of the lifting and conveying device 122 according to FIGS. 3 and 4b in a front view in the direction of the conveying direction. Two guide pillars 58 are fixedly connected to the lifting body 30 on the underside, which guide pillars extend downward through shaft bearing blocks 60 and the base panel 34 as well as through the plate profile 48. The lifting body 30 is thus guided linearly via the guide pillars 58 and is movable in a lifting motion relative to the base panel 34 and the components arranged thereon. Pressure springs are pushed onto the guide pillars 58 and pre-tensioned between the base panel 34 and the plate profile 48. The plate profile 48 according to FIG. 6 is thus tensioned downward away from the base panel 34. The strands of the conveyor means 28 are thus pre-tensioned. Driven by the electric stepping motor 38, a lifting of the lifting body 30 is generated and the complete unit comprising the plate profile 48, drive motor 118, clutch 56 and belt pulleys 44 is carried along in the lifting direction via the described tensioned connection of the conveyor means 28. If the lift is reversed via the electric stepping motor 38, the lifting body is therefore lowered; therefore, the pressure springs ensure the lowering of the unit comprising the drive motor 118 and belt pulleys 44 and, via the tension of the conveyor means 28, the constant contact of the lifting body 30 with the cam gear (concealed) controlling the lift. Fine adjustment nuts 62 are furthermore provided for adjusting the pre-tension of the conveyor means 28.

Figure 7:
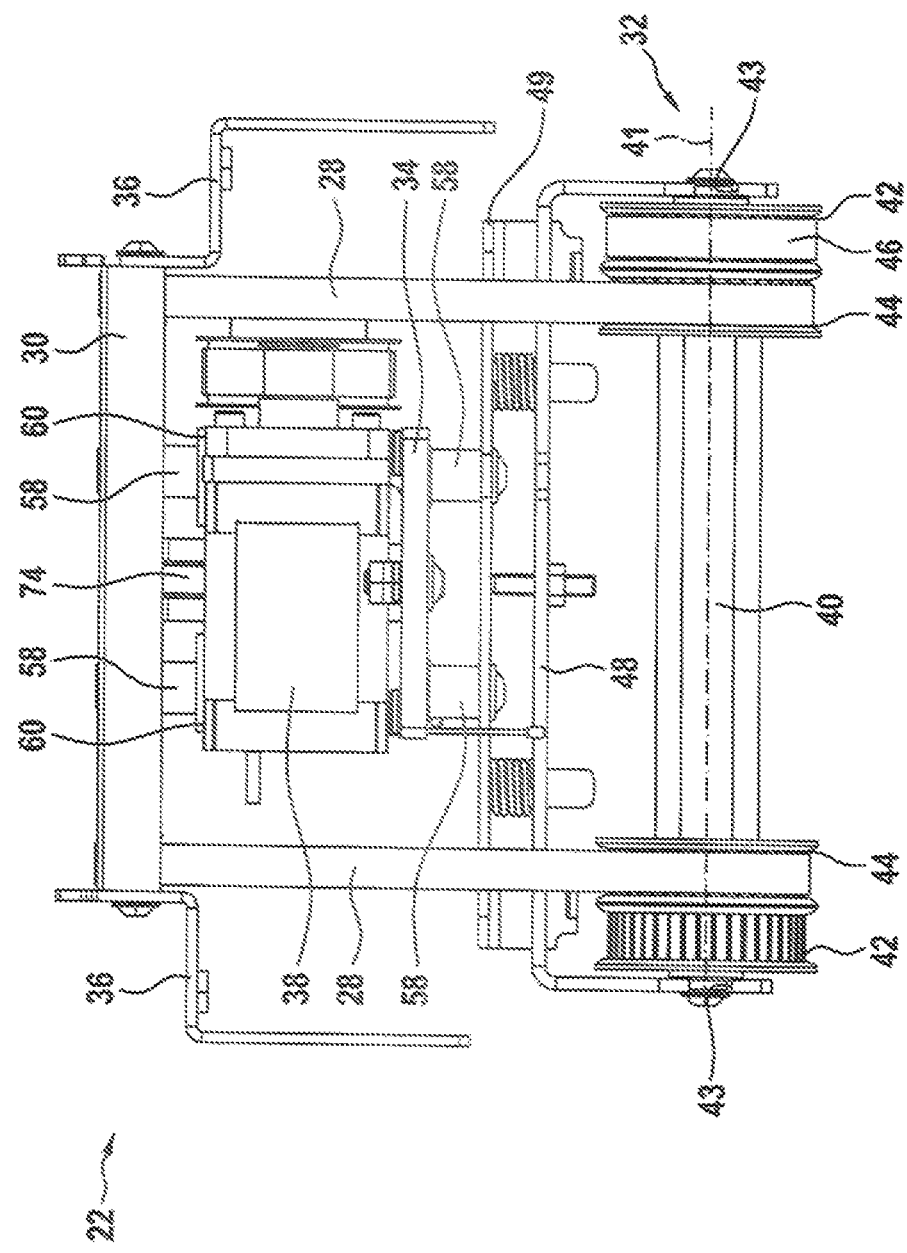
FIG. 7 the lifting and conveying device according to FIGS. 2 and 5b in a front view.

FIG. 7 shows the exemplary embodiment according to FIGS. 2 and 5b in a front view, which was also selected in FIG. 6. As already mentioned, the substantial difference from the above-described exemplary embodiment is that the conveyor means 28 is driven by means of the conveyor gear 32 and the decentralized drive motor 18 (c.f. FIG. 1). From observation of the conveyor gear 32 according to FIG. 1, which is also used for the exemplary embodiments according to FIGS. 5a, 5b and 5c, it can be seen that, when executing the lift 24, the belt pulleys 42 and therefore the drive shaft 40 are forced into a circular segment-shaped movement by the toothed belt 46. The drive shaft 40 therefore has a movement component in the lifting direction 24 and transversely thereto. However, since the lifting body 30 and the guide pillars 58, owing to their fixed linear guidance in the base panel 34 and the shaft bearing blocks 60, can only implement the lifting movement 24, a relative movement of the drive shaft 40 in the direction of the arrow 50 according to FIG. 2 must be enabled. This takes place via the constructive division into the plate profile 48 and mounting plate 49 according to FIG. 7. Moreover, the drive shaft 40 is slidingly mounted in slot-like receiving recesses 43 which extend in the direction of the arrow 50 according to FIG. 2.

Figure 8:
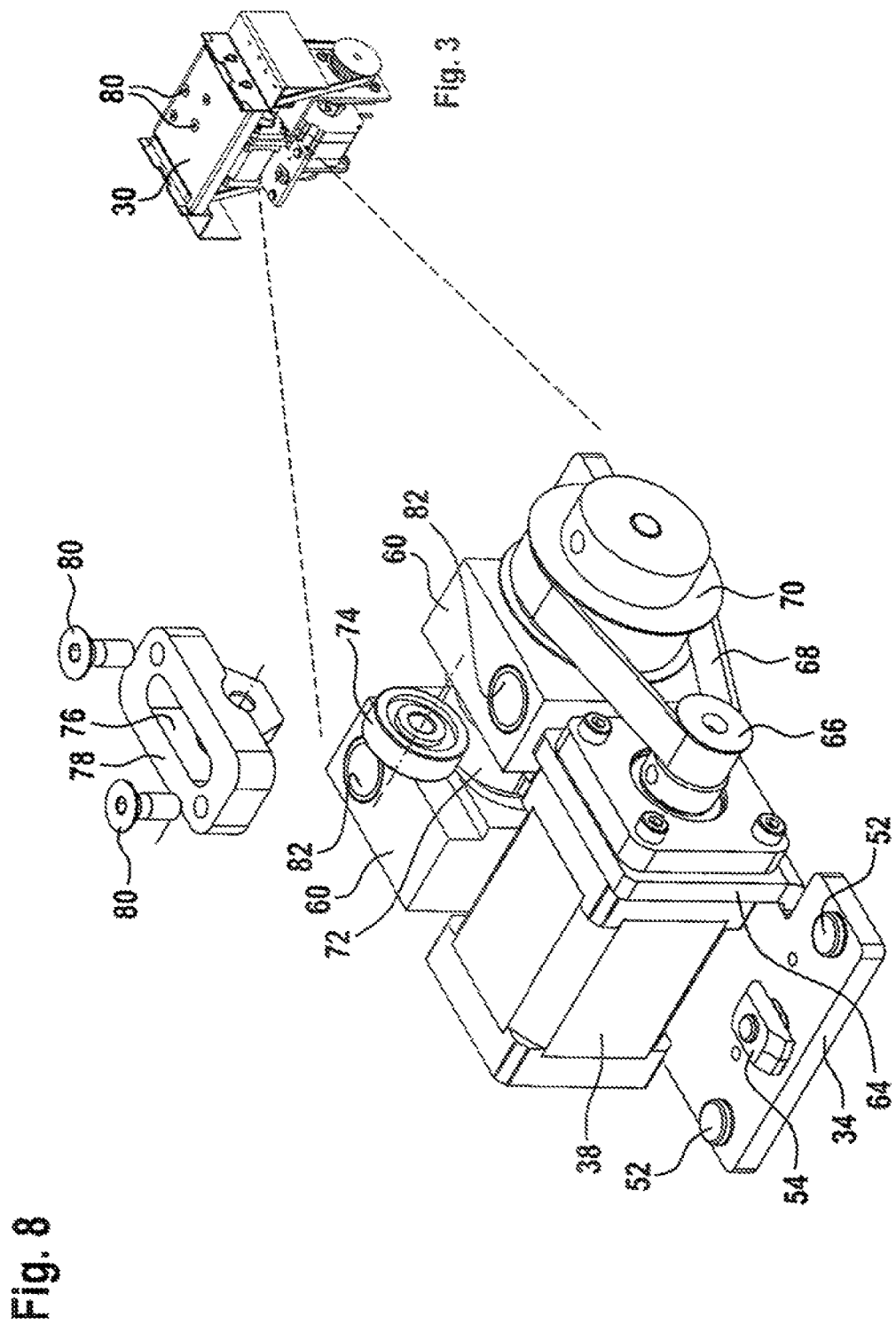
FIG. 8 a lifting device of the lifting and conveying device which is the same across all exemplary embodiments.

FIG. 8 shows a lifting device, which is installed in the lifting and conveying device 22; 122; 322; 522 and brings about the lift 24. By way of example, FIG. 3 of the lifting and conveying device 122 is illustrated on a reduced scale at the top right of FIG. 8 in order to demonstrate the spatial region in said lifting and conveying device which is taken up by the lifting device. It is possible to see the above-mentioned solid base panel 34 with the screws 52 and the profile nut 54 for fastening the base panel to the profile 14 according to FIG. 1. Angled from the base panel 34 is a flange portion 64 on which the electric stepping motor 38 is flange-mounted by its end face. In this case, the flange portion 64 is penetrated by the drive shaft of the electric motor 38, on the end portion of which a toothed belt pulley 66 is fixedly arranged in terms of rotation. This is in turn fixedly connected in terms of rotation to a toothed belt pulley 70 with a larger circumference via a toothed belt 68. In this case, the toothed belt pulley 70 is fixedly connected in terms of rotation to a shaft (not illustrated) which is rotatably mounted on shaft bearing blocks 60. Arranged centrally between the shaft bearing blocks 60 is a cam disk 72 of a cam gear, along the outer circumferential control surface of which a rolling body 74 rolls. This latter is rotatably mounted in a slot 76 of a roller bearing 78. In this case, the roller bearing 78 and the rolling body 74 are illustrated in an exploded illustration. The roller bearing 78 is fastened to the lifting body 30 on the underside via screws 80. The shaft bearing blocks 60 are penetrated by a passage recesses 82 which, according to the previous figures, have the guide pillars 58 reaching through them (not illustrated) in all exemplary embodiments.

Upon the step-wise rotation of the toothed belt pulley 66 via the electric stepping motor 38, the rotation is transmitted with a step-down gear to the toothed belt pulley 70 and therefore to the cam disk 72. The rolling body 74 rolls along the control surface 86 of the cam disk with little friction. Owing to the eccentric form of the control surface 86 of the cam disk 72, the rolling body 74, and therefore the lifting body 30, is moved in the lifting direction 24.

Figure 9:
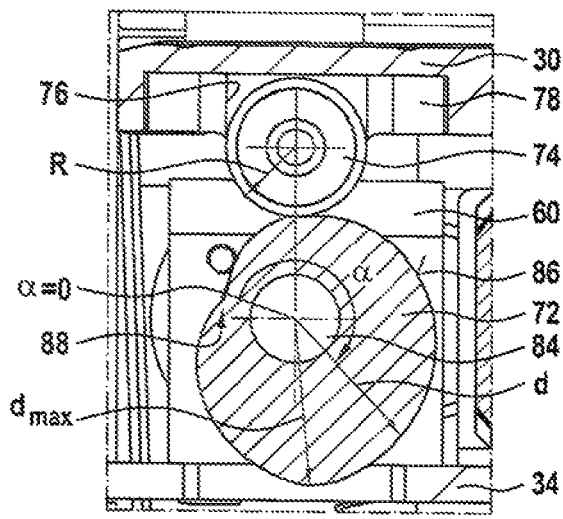
FIG. 9 an exemplary embodiment of a cam gear of the lifting and conveying device.

For all exemplary embodiments of the previous figures, FIG. 9 demonstrates the associations in the region of the cam disk 72 with reference to a section which leads transversely through the rolling body 74 and the cam disk 72. The cam disk 72 is fixedly connected in terms of rotation to the shaft 84 and extends cylindrically in the shaft direction with a geoid cross-section. In this case, a radial spacing d of the outer circumferential control surface 86 of the cam disk 72 varies with the circumferential angle α thereof. Starting from a value α=0 with the smallest radial spacing $d_{min}$, the radial spacing d increases with the increasing circumferential angle α substantially to a maximum value $d_{max}$. With a further increasing circumferential angle α, the radial spacing d decreases again to the minimum value $d_{min}$ where α=0. In this case, the increase in the radial spacing d to the maximum value $d_{max}$ has approximately the progression of a spiral function. The same applies for the decrease in the radial spacing d, starting from the maximum value $d_{max}$ to the minimum value $d_{min}$ where α=0.

Figure 10:
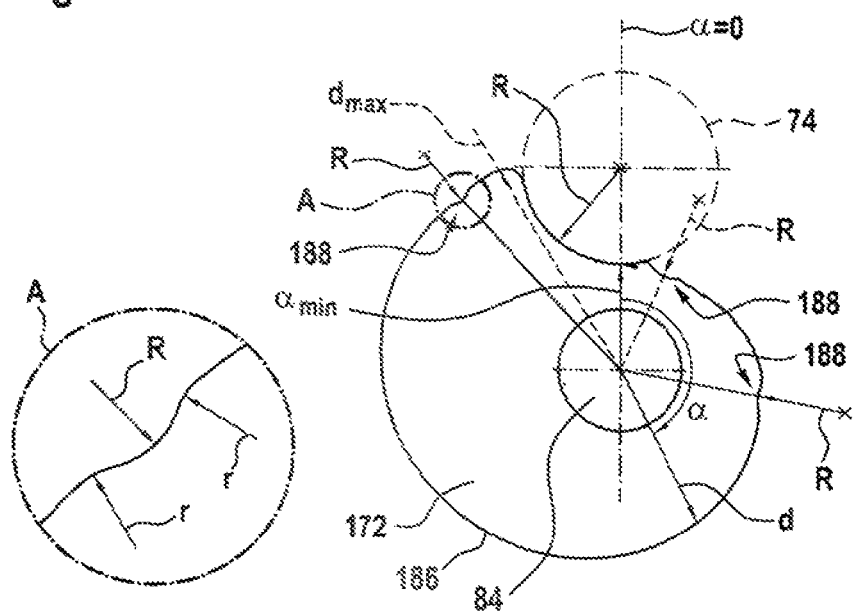
FIG. 10 a second exemplary embodiment of a cam gear of the lifting and conveying device.

FIG. 10 shows a second exemplary embodiment of a cam disc 172, by means of which the lifting body 30 can be latched in a plurality of intermediate or stop positions. Starting from a minimum radial spacing $d_{min}$ where α=0, the radial spacing d increases with the increasing circumferential angle α to a maximum value $d_{max}$. If the cam disc 72 in FIG. 9 has its apex $d_{max}$ approximately at a circumferential angle of 240°, the cam disk 172 according to FIG. 10 only reaches the apex $d_{max}$ at a circumferential angle α of approximately 330°. Between α=0 and α=330°, the radial spacing d increases substantially with a spiral function. However, the constant increase here is interrupted by three regions or latching portions 188 of the control surface 186. Here, the radial spacing d has a local minimum in each case, whereby the control surface 186 at this point has a radially inwardly concavely formed recess 188. In this case, the radius R of the recess 188 is identical to the radius R of the rolling body 74, whereby both move into form-fitting engagement when the angle of rotation corresponding to the latching portion 188 is adjusted by the electric stepping motor 38. The lifting body 30 can thus be held in a torque-free position by the slight latching of the rolling body 74 with the cam disk 172.

Disclosed is a lifting and conveying device having a lifting body and a conveyor means, revolving thereon, for transporting an item, wherein, to generate the linear lift of the lifting body, a rotary drive and a gear for converting the rotation of the rotary drive into the lift are provided.

Furthermore disclosed is a section conveyor having at least one first conveyor path and a lifting and conveying device of this type for moving the item to be conveyed from the first conveyor path.

LIST OF REFERENCE SIGNS

1 Section conveyor
2 First conveyor line
4 First conveying direction
6 Second conveyor line
8 Second conveying direction
10 First conveyor axis
12 Second conveyor axis
14 Profile
16 Two-strand conveyor means
18; 118 Drive motor
20 Gear
22; 122; 222; Lifting and conveying device
322; 422; 522 Lifting and conveying device
24 Conveying direction
28 Two-strand conveyor means
30 Lifting body
32 Conveyor gear
34 Base panel
36 Cover plate
38 Electric stepping motor
40 Drive shaft
42 Belt pulley
43 Bearing mount
44 Belt pulley
46 Toothed belt
48 Plate profile
49 Mounting plate
50 Sliding direction
52 Screw
54 Profile nut
56 Clutch
58 Guide pillar
60 Shaft bearing block
62 Fine adjustment nut
64 Flange portion
66 Toothed belt pulley
68 Toothed belt
70 Toothed belt pulley
72; 172 Cam disk
74 Rolling body
76 Slot
78 Roller bearing
80 Screw
82 Passage recess
84 Shaft
86; 186 Control surface
88; 188 Latching portion

What is claimed is:

1. A lifting and conveying device, comprising:
a lifting body;
a revolving conveyor element deflected on the lifting body to a conveyor path configured such that an item is conveyed along the conveyor path;
a linear drive including a rotary motor and a motor gear, the linear drive configured to engage the lifting body in order to lift the conveyor path, the motor gear including a cam disk rotationally driven by the rotary motor and configured to convert an angle of rotation into the lifting of the conveyor path, the cam disk being indirectly or directly engaged or engagable with the lifting body;
a base body that is stationary with respect to a section conveyor, the rotary motor and the cam disk supported by the base body; and
a tensioning member that tensions the lifting body against the cam disk.

2. The lifting and conveying device according to claim 1, wherein the rotary motor includes an electric motor.

3. The lifting and conveying device according to claim 2, wherein the electric motor is a stepping motor.

4. The lifting and conveying device according to claim 1, further comprising:
a conveyor motor configured to drive the revolving conveyor element; and/or
a conveyor gear configured to couple to a drive of the section conveyor.

5. The lifting and conveying device according to claim 1, wherein:

the cam disk includes an eccentric control surface having a radial spacing defined from an axis of rotation of the cam disk to the eccentric control surface; and the radial spacing depends on a circumferential angle of the cam disk.

6. The lifting and conveying device according to claim 5, wherein the eccentric control surface is configured to slide along a lifting body portion or to roll along a rolling body rotatably connected to the lifting body.

7. The lifting and conveying device according to claim 5, wherein:

the radial spacing increases with an increase in the circumferential angle from a minimum value to a maximum value; and/or the radial spacing increases with an increase in the circumferential angle from a minimum value to a maximum value and then decreases again.

8. The lifting and conveying device according to claim 5, wherein the eccentric control surface is divided in a circumferential direction into lifting portions which cause different lifting speeds at a constant rotational speed of the cam disk.

9. The lifting and conveying device according to claim 5, wherein the eccentric control surface is divided in a circumferential direction into at least one latching portion which brings the lifting body to a stop.

10. The lifting and conveying device according to claim 9, wherein the at least one latching portion is arranged (i) in a circumferential angle region of the minimum value or the maximum value, or (ii) in a circumferential angle region between the minimum value and the maximum value.

11. The lifting and conveying device according to claim 9, wherein:

the at least one latching portion includes a concave recess or depression;

the eccentric control surface is configured to slide along a lifting body portion or to roll along a rolling body rotatably connected to the lifting body; and the lifting body portion or rolling body is configured to dip, at least in sections, into the concave recess or depression.

12. The lifting and conveying device according to claim 11, wherein the at least one latching portion is configured to be arranged in positive fit with the lifting body portion or a portion of the rolling body.

13. The lifting and conveying device according to claim 9, wherein edges of at least one latching portion are arranged in the circumferential direction and are rounded.

14. The lifting and conveying device according to claim 1, wherein the tensioning member is a spring.

15. The lifting and conveying device according to claim 14, further comprising:

at least one belt pulley configured to drive a conveyor belt of the lifting and conveying device, the at least one belt pulley being movable with the lifting body.

16. The lifting and conveying device according to claim 15, wherein the at least one belt pulley and the lifting body are supported by a support structure, and the spring biases the support structure relative to the base body so as to tension the lifting body against the cam disk.

17. A device, comprising:

a first conveyor element which revolves along a first conveyor path; and a lifting and conveying device configured to lift and move an item from the first conveyor path, the lifting and conveying device arranged in a stationary manner on the first conveyor path, the lifting and conveying device comprising:

a lifting body;

a revolving conveyor element deflected on the lifting body to the first conveyor path so as to move the item along the conveyor path;

a linear drive including a rotary motor and a motor gear, the linear drive configured to engage the lifting body in order to lift the first conveyor path, the motor gear including a cam disk rotationally driven by the rotary motor and configured to convert an angle of rotation into the lifting of the first conveyor path, the cam disk being indirectly or directly engaged or engagable with the lifting body;

a base body that is stationary with respect to the first conveyor element, the rotary motor and the cam disk arranged on the base body; and a tensioning member that tensions the lifting body against the cam disk.

\* \* \* \* \*